Patented Sept. 3, 1929.

1,727,223

UNITED STATES PATENT OFFICE.

JOHANNES VAN LOON, OF DEVENTER, NETHERLANDS, ASSIGNOR, BY MESNE ASSIGNMENTS, TO NOVADEL-AGENE CORPORATION, OF NEWARK, NEW JERSEY, A CORPORATION OF DELAWARE.

FERMENTATION PROCESS.

No Drawing. Application filed February 18, 1926, Serial No. 89,218, and in Germany February 25, 1925.

The present invention relates to an improvement of fermentation processes, by the employment of specific materials of the kind hereinafter described, by virtue of which the fermentation process is made more rapid, perhaps by a stimulation of the activity of the organisms producing fermentation.

Much experimentation has heretofore been conducted, with the idea of diminishing the time necesasry for conducting the fermentation, and to obtain the best possible yields of the fermentation products, as well as to maintaining the organisms producing fermentation in a highly active state and to cause the said organisms to multiply rapidly in the material undergoing fermentation. It is well known in the art, that the presence of materials which exercise a sterilizing effect upon the principal organisms involved in the fermentation will have a bad influence upon the activity of said organisms.

In accordance with the present invention, it has been found that the addition of a very small quantity of peroxidized compounds of the kinds stated below to the fermentation materials, whether these compounds be soluble or insoluble, and whether they be organic or inorganic, exercises a marked increase in the activity of the fermentation organisms, and cause the said organisms to multiply rapidly. As examples of very suitable substances, the peroxides of organic acids, for example benzoyl peroxid, are specially called to attention. Without restricting the invention to any particular theory of operation, it is stated that it appears probable from the experiments conducted, that the presence of these small quantities of peroxid compounds, is able to activate the oxygen present, in a particular way, favorable to the fermentation organisms present in the material undergoing fermentation. It has been shown by the experiments conducted, that the presence of the small quantities of the peroxidized compound is not in any way injurious to the organisms themselves, which seems to be a surprising fact on account of the well known tendency of peroxidized compounds generally, to oxidize organic matter, and to act as sterilizing agents, to destroy organisms of the character referred to.

It will be understood that the peroxid compounds can be added alone to the material to be fermented, or they can be added with other materials which serve as food for the fermentation organisms, such as sulphates, phosphates and the like. These substances can be added before or after the addition of the peroxidized compounds or simultaneously therewith as desired, it being advisable in many cases to add the nutritious materials first in order to produce a vigorous growth of the fermentation organisms, before adding the peroxid compounds.

The process has been found to be suitable for use with yeast, such as is used in the production of alcohol from sugary materials.

In a particular experiment, 2 grams of compressed yeast (Presshefe) were added to a solution of 4 grams of sugar, in 40 c. c. of water, at a temperature of 30° C., which temperature was maintained throughout the operation, and the material was allowed to ferment for 5 hours in the usual manner. In a second experiment, conducted parallel with the first one, and under identical conditions, and using the same quantities of the materials, 0.02 grams of benzoyl peroxid was added to the material, and this material was then allowed to ferment for 5 hours.

The materials in each case were weighed at the expiration of five hours, and in the first instance the loss in weight was 1.4608 grams, and in the second case the loss was 1.7058 grams this loss representing carbon dioxid evolved. From these figures it shows that in the second case, namely in the presence of benzoyl peroxid, in conducting the fermentation for five hours, 0.245 grams more of carbon dioxide was formed (i. e. an increase of nearly 17% in amount), in the presence of the small quantity of benzoyl peroxid stated, the condition being otherwise the same. Numerous other tests have been made with similar results. Another experiment for instance is as follows:

2 grams of compressed yeast divided in 40 c. c. of a sugar solution of 10 percent strength are exposed in a so-called Meissl apparatus to fermentation under the addition of 15 milligram dibenzaldiperoxyde at a temperature of 35 degrees C. After 5 hours of fermentation the carbonic acid produced thereby amounted to 15 percent more than produced in another similar experiment without the addition of dibenzaldiperoxyde.

Another experiment has shown that in case zinc-peroxid is used as an activator, there was an increase of carbonic acid amounting to about 10 percent.

In the above experiments I have selected a fermentation period of 5 hours. However when carrying out commercial fermentations on a large scale, other lengths of time can be employed, depending on the particular materials.

Moreover I do not limit myself to the use of yeast, as there are many other well-known forms of fermentation which are included in my invention, for example fermentation by *Aspergillus niger*, or the fermentation by yoghurt and the like.

Aspergillus is a kind of mold, of which several species (including *A. niger*) are used in production of Koji yeast, Taka-diastase, and other ferments used in the production of breads, alcoholic liquids etc. Yoghurt is a material made from milk somewhat similar to kefir.

As to the temperature it is well known that the fermentation can be most advantageously conducted at particular temperatures depending on the material to be fermented. Usually the best temperature lies between 25 and 40 degrees C.

As to the quantities of percompounds used for my process, it must be stated that not only the kind of the fermentation race but also their age, that is to say their vital energy is of importance, as well as the kind of the materials to be fermented. In connection with these facts the quantities of percompounds used in my process can be varied within certain limits; viz for instance between 0.2 and 0.002 percent.

Percompounds which are most suitable to be used in the process herein described, are:

The organic peroxids of the type of benzoylperoxid or of acetyl-benzoylperoxid.

The organic peracids such as peracetic acid or perbenzoic acid and salts thereof.

The salts of the organic peroxids.

The inorganic peroxids which may be considered as addition compounds of hydrogen-peroxid.

I do not limit myself either to special representatives of the groups of compounds mentioned, nor to a special form in which they are added to the materials to be fermented.

The quantity of percompounds required may be varied according to the kind of flour used or to the materials which shall be brought to fermentation or to the fermentation food.

The peroxidized compounds herein above mentioned are (under normal conditions) solids, and it is more advisable to use solids than liquids, since the former act more gradually on account of the fact that it requires more or less time for the solid material to go into solution. Furthermore the stimulating effect of the solid peroxides is more lasting than would be the effect of liquid compounds.

I claim:—

1. A process for improving fermentation, which consists in carrying out yeast fermentation in the presence of a peroxid derived from hydrogen peroxide by the substitution of hydrogen thereof.

2. The herein described improvement which comprises conducting fermentations in which living organisms act to effect fermentation, while in the presence of a minute quantity of an organic peroxidized compound.

3. In the art of fermentation, the herein described improvement which comprises adding to the material in which fermentation by means of living organisms is conducted, an amount of an organic peroxidized compound which is capable of stimulating the activity of the organisms of fermentation and insufficient to prevent activity thereof, such peroxidized compound being present, to some extent at least, during the fermentation.

4. The herein described improvement which comprises conducting yeast fermentations while in the presence of a minute quantity of an organic peroxidized compound.

5. The herein described improvement which comprises conducting fermentations in which living organisms act to effect fermentation while in the presence of a minute quantity of benzoyl peroxid.

6. In the art of fermentation, the herein described improvement which comprises adding to the material in which fermentation by means of living organisms is conducted, an amount of benzoyl peroxid which is capable of stimulating the activity of the organisms of fermentation and insufficient to prevent activity thereof a part at least of such peroxid being present during the fermentation.

In testimony whereof I affix my signature.

JOHANNES van LOON.